(12) United States Patent
Yeckley et al.

(10) Patent No.: US 7,368,406 B2
(45) Date of Patent: May 6, 2008

(54) WHISKER-REINFORCED CERAMIC CONTAINING ALUMINUM OXYNITRIDE AND METHOD OF MAKING THE SAME

(75) Inventors: Russell L. Yeckley, Latrobe, PA (US); Shanghua Wu, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 11/234,013

(22) Filed: Sep. 23, 2005

(65) Prior Publication Data

US 2006/0030474 A1 Feb. 9, 2006

Related U.S. Application Data

(60) Division of application No. 11/101,260, filed on Apr. 7, 2005, now Pat. No. 7,262,145, which is a continuation-in-part of application No. 10/831,383, filed on Apr. 23, 2004, now abandoned.

(51) Int. Cl.
*C04B 35/81* (2006.01)
*C04B 35/515* (2006.01)
*C04B 35/577* (2006.01)

(52) U.S. Cl. .................. 501/95.3; 501/92; 501/96.1

(58) Field of Classification Search ............... 501/95.3, 501/96.1, 92
See application file for complete search history.

(56) References Cited

U.S. PATENT DOCUMENTS

| | | | |
|---|---|---|---|
| 4,241,000 A | 12/1980 | McCauley et al. | |
| 4,320,203 A | 3/1982 | Brandt et al. | |
| 4,481,300 A | 11/1984 | Hartnett et al. | |
| 4,520,116 A | 5/1985 | Gentilman et al. | |
| 4,543,345 A | 9/1985 | Wei | |
| 4,636,374 A | 1/1987 | Kurihara et al. | |
| 4,686,070 A | 8/1987 | Maguire et al. | |
| 4,720,362 A | 1/1988 | Gentiman et al. | |
| 4,745,091 A | 5/1988 | Landingham | |
| 4,786,448 A * | 11/1988 | Fukuhara et al. ............. 264/85 |
| 4,789,277 A | 12/1988 | Rhodes et al. | |
| RE32,843 E | 1/1989 | Wei | |
| 4,801,564 A | 1/1989 | Baba | |
| 4,946,808 A | 8/1990 | Wei et al. | |
| 4,948,761 A | 8/1990 | Hida | |
| 4,957,885 A | 9/1990 | Hida | |
| 4,961,757 A | 10/1990 | Rhodes et al. | |

(Continued)

FOREIGN PATENT DOCUMENTS

EP 0 357 579 B1 1/1993

(Continued)

OTHER PUBLICATIONS

Y. Berriche et al., "Severe Wear Mechanisms in Al2O3—AlON Ceramic Composites", Jor. Ep. Cer. Soc. 20 (2002) pp. 1311-1318.

(Continued)

*Primary Examiner*—Karl E Group
(74) *Attorney, Agent, or Firm*—John J. Prizzi (57) ABSTRACT

A ceramic body, as well as a method for making the same, wherein the ceramic body contains aluminum oxynitride and whiskers, (and optionally) one or more of titanium carbonitride, and/or alumina, and/or zirconia, and/or other component(s).

30 Claims, 3 Drawing Sheets

U.S. PATENT DOCUMENTS

| | | |
|---|---|---|
| 5,053,363 A | 10/1991 | Brandt |
| 5,075,265 A | 12/1991 | Narula |
| 5,096,862 A | 3/1992 | Mathers et al. |
| 5,132,257 A | 7/1992 | Kodama et al. |
| 5,135,814 A | 8/1992 | Dekosky |
| 5,231,062 A | 7/1993 | Mathers et al. |
| 5,254,142 A | 10/1993 | Johansson et al. |
| RE34,446 E | 11/1993 | Wei |
| 5,352,533 A | 10/1994 | Dreyer et al. |
| 5,378,417 A | 1/1995 | Yasutomi et al. |
| 5,389,586 A | 2/1995 | Rogers et al. |
| 5,398,858 A | 3/1995 | Dugan et al. |
| 5,418,197 A | 5/1995 | Brandt |
| 5,420,083 A | 5/1995 | Brandt |
| 5,449,647 A | 9/1995 | Brandt |
| 5,538,926 A | 7/1996 | Tsuchida et al. |
| 5,656,561 A | 8/1997 | Rogers et al. |
| 5,688,730 A | 11/1997 | Bachelard et al. |
| 5,955,390 A | 9/1999 | Mehrotra et al. |
| 5,994,250 A | 11/1999 | Suzuki et al. |
| 6,169,048 B1 | 1/2001 | Sjogren et al. |
| 6,204,213 B1 | 3/2001 | Mehrotra et al. |
| 6,447,896 B1 | 9/2002 | Augustine |
| 6,454,822 B1 | 9/2002 | Rosenflanz |
| 6,458,731 B1 | 10/2002 | Rosenflanz |
| 6,605,556 B1 | 8/2003 | Bose |
| 6,620,756 B2 | 9/2003 | Mah et al. |
| 6,955,798 B2 | 10/2005 | Miao |
| 7,045,091 B1 | 5/2006 | Patel et al. |
| 7,071,139 B2 | 7/2006 | Gole |

FOREIGN PATENT DOCUMENTS

| | | |
|---|---|---|
| EP | 0 247 630 B1 | 1/1996 |
| EP | 0 496 712 B1 | 4/1996 |
| EP | 0 619 269 B1 | 1/1998 |
| EP | 0 861 219 B1 | 3/2002 |
| EP | 0 927 709 B1 | 10/2002 |
| JP | 58-135112 | 8/1983 |
| JP | 64-061375 | 3/1989 |
| JP | 7126077 A2 | 5/1995 |
| JP | 11-092228 | 4/1999 |
| WO | PCT WO 97/18177 | 5/1997 |
| WO | PCT WO 02/06156 A1 | 1/2002 |

OTHER PUBLICATIONS

T. Mroz, Jr. et al., "Fabrication of AlN—SiC Whisker Composites", Cer. Sci. Proceedings (9-10) 1993 pp. 1098-1107.

D. Djenkal et al., "SiC-Reinforcement of an Al2O3—yAlON Composite", Jor. Ep. Cer. Soc. (2000) pp. 2585-2590.

Shimpo et al., "AlON and its Composite Ceramics" Jor. Cer. Soc. Japan, Intl. Edition Vo. 100-508, no date.

Whitney, E.D., "Modern Ceramic Cutting Tool Materials", 1982 AMS Metals Congress, St. Louis, Missouri (Oct. 23-28, 1982) pp. 1-16.

Rayethon Press Release on Aluminum Oxynitride (Jul. 25, 2002) 2 pages.

Surmet Corp. Press Release on Aluminum Oxynitride (Jul. 22, 2002) 1 page.

Internet Printout on "AlON" entitled A Tough, New, Light Weight, Transparent Ceramic Material May Hold the Key to Better Protection for Flight Crews (2 pages)Printed Oct. 2003.

Internat Article from Nanomet,Inc. entitled "Cost Effective Processing of High-Purity Gamma Aluminum Oxynitride" (3 pages) (printed Oct. 2003).

Brochure entitled "Transparent Armor Systems" from the U.S. Army Research Laboratory (2 pages), no date.

Materials and Manufacturing Directorate, Air Force Research LAboratory (Spring 2003) 4 pages.

Internet Printout entitled "Aluminum Oxynitride (AlON)" by Sienna Technologies, Inc. (1 page), no date.

SURMET Property Data Sheet for AlON Optical Ceramic (1 page), no date.

Zuotai et al., "Manufacture and Properties of AlON—TiN Particulate Composites", Materials and Design 26 (2005) pp. 363-368.

Djenkal et al., "Elaboration and Mechanical Properties of Al2O3—yAlON—SiC Composite for Cutting Tool Applications", Fourth Euro Ceramics, vol. 4 pp. 201-208, no date.

PCT International Search Report mailed Nov. 9, 2005 for PCT International application No. PCT/US05/13123.

PCT Written Opinion mailed Nov. 9, 2005 for PCT International application No. PCT/US05/13123.

PCT International Preliminary Report of Patentability for PCT Application No. PCT/US05/13123 mailed Mar. 29, 2006 (4 pages).

* cited by examiner

WHISKER-REINFORCED CERAMIC CONTAINING ALUMINUM OXYNITRIDE AND METHOD OF MAKING THE SAME

RELATED APPLICATIONS

This application is a divisional patent application of U.S. patent application Ser. No. 11/101,260 filed on Apr. 7, 2005, now U.S. Pat. No. 7,262,145, which is a continuation-in-part of U.S. patent application Ser. No. 10/831,383, filed on Apr. 23, 2004, now abandoned.

BACKGROUND OF THE INVENTION

The present invention pertains to a whisker-reinforced ceramic and a method for making the same. More specifically, the invention pertains to a whisker-reinforced ceramic that contains aluminum oxynitride, and optionally, other materials, and a method for making the same.

Whisker-reinforced materials such as, for example, whisker-reinforced ceramics have been known for some time. In this regard, U.S. Pat. No. 4,543,345 to Wei describes a silicon carbide whisker-reinforced alumina ceramic material. U.S. Pat. No. 4,789,277 to Rhodes et al. and U.S. Pat. No. 4,961,757 to Rhodes et al. each disclose a ceramic cutting tool wherein the ceramic is a silicon carbide-whisker-reinforced alumina.

U.S. Pat. No. 6,447,896 to Augustine discloses a coated ceramic cutting tool wherein the ceramic contains silicon carbide whiskers. According to the Augustine patent, there is a listing of many ceramics suitable for use as a whisker-reinforced ceramic. These ceramics include, among many, alumina, titanium carbonitride, zirconium oxide and aluminum oxinitride.

Further, European Patent No. 0 247 630 B1 to NGK Spark Plug pertains to a ceramic material that is useful as a cutting tool. The ceramic substrate is based on a matrix composed of at least one material selected from the group consisting of $Al_2O_3$, AlN, AlON, $3Al_2O_3 \cdot 2SiO_2$ (mullite) and TiC, and the substrate further comprises 5 to 50% by weight of SiC whiskers with respect to said substrate.

European Patent No. 0 861 219 B1 to Kennametal Inc. (as well as U.S. Pat. No. 5,955,390 and U.S. Pat. No. 6,204,213 B1 to Mehrotra et al. that are assigned to Kennametal Inc.) discloses titanium carbonitride-alumina-silicon carbide whisker ceramics. In these ceramics, the titanium carbonitride is the dominant matrix component.

While the above ceramic materials exhibit satisfactory properties, at least in certain situations, there still remains the need to develop new and useful ceramic materials. This is especially true for ceramic materials that are useful as cutting tools.

Heretofore, in experimental work done in the in-house facilities of Kennametal Inc. of Latrobe, Pa. 15650 USA (the assignee of the present patent application), the inventors have considered the use of aluminum oxynitride as a component of a ceramic material useful as a cutting tool. Aluminum oxynitride has mechanical properties that are similar to those of alumina, but it has a higher strength and a lower coefficient of thermal expansion than alumina. In light of these properties, the inclusion of aluminum oxynitride in a ceramic was thought to improve its thermal shock resistance. It was believed that the principal failure mechanism of alumina-silicon carbide whisker reinforced ceramic cutting tools in turning nickel-based high temperature alloys was depth-of-cut notch. There was the belief that this failure mechanism, i.e., depth-of-cut notch, was related to the thermal shock resistance and the impact strength of the cutting tool material.

Still in experimental work the inventors did in the past in the in-house facilities of Kennametal Inc., the typical way to make a ceramic material that contained aluminum oxynitride and silicon carbide whiskers was to use alumina and aluminum nitride as a part of the starting components. These starting components were hot-pressed at temperatures on the order of about 1950 degrees Centigrade. It was found that by hot pressing this powder mixture containing aluminum nitride and silicon carbide whiskers at temperatures on the order of about 1950 degrees Centigrade, the aluminum nitride and the silicon carbide whiskers formed a solid solution that caused a strong interface there between. This interface prevented whisker pull-out, i.e., pull-out of the silicon carbide whiskers from the ceramic matrix. The absence of whisker pull-out resulted in the degradation of the performance properties of the ceramic cutting tool.

In regard to whisker pull-out, U.S. Reissue Pat. No. 34,446 to Wei sets forth a discussion of whisker pull-out at Column 2, lines 30 through 53:

The use of the single crystal whiskers in the ceramic composite provide a significant improvement in the fracture toughness of the composite due to their ability to absorb cracking energy. More specifically, in a ceramic matrix where the SiC whisker-matrix interface sheer strength is relatively low as provided by radial tensile stresses across the whisker-matrix bond a process termed "whisker pull-out" occurs during cracking to absorb the cracking energy and effectively reduce the tendency to crack and also inhibit crack propagation. Whisker pull-out occurs as the matrix is subjected to crack-forming stresses. As the crack-front propagates into the composite many of the whiskers which span the crack line and extend into the ceramic matrix on opposite sides of the crack must be either fractured or pulled out of the matrix in order for the crack to grow or propagate through the ceramic. Since the single crystal SiC whiskers possess sufficient tensile strength so as to resist fracturing they must be pulled out of the matrix for the crack to propagate. As these whiskers are pulled out of the matrix they exhibit considerably bridging forces on the face of the crack and effectively reduce the stress intensity at the crack tip so as to absorb the cracking energy.

In experimental work done by the inventors in the in-house facilities of Kennametal Inc., when titanium carbonitride was a component in the starting powder, along with aluminum nitride and alumina and silicon carbide whiskers, it was found that the titanium carbonitride and the silicon carbide considerably delayed the formation of the aluminum oxynitride. In order to overcome this consequence, the hot-pressing temperature had to be raised to such a level that the silicon carbide whiskers suffered damage.

In experimental work done by the inventors in the in-house facilities of Kennametal Inc., it was also found that when using aluminum nitride and alumina to form the aluminum oxynitride, it was difficult to control the final composition of the ceramic. More specifically, this was due to the difficulty associated with controlling the amount of aluminum oxynitride produced when using aluminum nitride and alumina in the starting powders.

Thus, it can be seen that it would be highly desirable to provide an improved whisker-reinforced ceramic material, and especially a whisker-reinforced ceramic material useful as a cutting tool, that contains aluminum oxynitride.

It can also be seen that it would be highly desirable to provide an improved whisker-reinforced ceramic material, and especially a whisker-reinforced ceramic material useful as a cutting tool, that contains aluminum oxynitride wherein the whiskers exhibit satisfactory pull-out which can be considered to be satisfactory crack-bridging pull-out from the ceramic matrix.

Further, it can be seen that it would be highly desirable to provide an improved whisker-reinforced ceramic material, and especially a whisker-reinforced ceramic material useful as a cutting tool, that contains aluminum oxynitride wherein the hot-pressing of the powder mixture occurs at a temperature low enough so as to not damage the silicon carbide whiskers and minimize the grain growth of the aluminum oxynitride.

Finally, it can be seen that it would be highly desirable to provide an improved whisker-reinforced ceramic material, and especially a whisker-reinforced ceramic material useful as a cutting tool, that contains aluminum oxynitride wherein there is control over the amount of aluminum oxynitride in the ceramic.

SUMMARY OF THE INVENTION

In summary, the present invention is directed to a ceramic body (and its method of manufacture), such as a metalcutting tool, having about 2 to about 40 volume percent ceramic whiskers distributed in a matrix comprising aluminum oxynitride and, optionally, one or more ceramic additives. The aluminum oxynitride forms at least 10 volume percent, and up to about 98 volume percent, of the ceramic. Preferably, the ceramic contains at least 30 volume percent, more preferably at least 40 volume percent, and most preferably at least 50 volume percent aluminum oxynitride.

The densified ceramic according to the present invention preferably has an aluminum oxynitride grain size of less than 4 µm, preferably less than 3 µm, more preferably less than or equal to 2 µm, and most preferably less than or equal to 1 µm.

The ceramic additive, when present, is preferably titanium carbonitride, and/or alumina, and/or zirconia, and/or one or more sintering aids.

When titanium carbonitride is added, it is added at levels of up to 40 volume percent, and preferably 1 to 40 volume percent, and more preferably 5 to 15 volume percent.

When alumina is added, it is added at levels up to 40 volume percent, preferably 1 to 40 volume percent.

In one form thereof, the invention is a ceramic body that comprises a matrix that includes aluminum oxynitride. The ceramic body further includes whiskers distributed throughout the matrix. The aluminum oxynitride comprises between about 60 volume percent and about 98 volume percent of the ceramic body. The whiskers comprise between about 2 volume percent and about 40 volume percent of the ceramic body.

In another form thereof, the invention is a ceramic body that includes a matrix comprising aluminum oxynitride and a ceramic additive other than aluminum oxynitride. There are whiskers distributed throughout the matrix. The aluminum oxynitride comprises between about 30 volume percent and about 70 volume percent of the ceramic body. The ceramic additive comprises between about 10 volume percent and about 40 volume percent of the ceramic body. The whiskers comprise between about 2 volume percent and about 40 volume percent, and more preferably between about 15 volume percent and 35 volume percent, of the ceramic body.

In yet another form thereof, the invention is a ceramic body that includes a matrix that comprises aluminum oxynitride and alumina and a ceramic additive other than aluminum oxynitride or alumina. There are whiskers distributed throughout the matrix. The aluminum oxynitride comprises between about 10 volume percent and about 25 volume percent of the ceramic body. The alumina comprises between about 25 volume percent and about 40 volume percent of the ceramic. The ceramic additive comprises between about 15 volume percent and about 35 volume percent of the ceramic body. The whiskers comprise between about 2 volume percent and about 40 volume percent, and more preferably between about 15 volume percent and 35 volume percent, of the ceramic body.

In still another form thereof, the invention is a ceramic body that comprises a matrix that includes aluminum oxynitride and zirconia. There are whiskers distributed throughout the matrix. The aluminum oxynitride comprises between about 30 volume percent and about 60 volume percent of the ceramic body. The zirconia comprises between about 1 volume percent and about 10 volume percent of the ceramic body. The whiskers comprise between about 2 volume percent and about 40 volume percent of the ceramic body.

In yet another form thereof, the invention is a process to make a ceramic body comprising the steps of: providing a starting powder mixture comprising aluminum oxynitride powder that contains less than or equal to about 0.1 weight percent aluminum nitride, ceramic whiskers, and a ceramic additive other than aluminum oxynitride; and consolidating the starting powder mixture into the ceramic body.

In another form thereof the invention is a process to make a ceramic body comprising the steps of: providing a starting powder mixture comprising between about 40 and about 98 volume percent aluminum oxynitride and between about 2 and about 40 volume percent whiskers; and consolidating the starting powder into the ceramic body.

In yet another form thereof, the invention is a process to make a ceramic body comprising the steps of: providing a starting powder mixture comprising between about 40 and about 98 volume percent aluminum oxynitride and between about 2 and about 40 volume percent whiskers; and hot-pressing the starting powder into the ceramic body at a temperature less than or equal to about 1750° C.

In still another form, the invention is a process of making aluminum oxynitride powder comprising the steps of: forming a powder mixture by mixing alumina powder and aluminum nitride powder according to the following formula: ((4−x)/3) alumina and x aluminum nitride wherein x is in mole percent and ranges between about 0.31 and about 0.61; adding between about 0.1 mole percent and about 1.0 mole percent of pure aluminum powder to the powder mixture; and reacting the powder mixture containing aluminum at a temperature between about 1600° C. and about 1900° C. for a duration between about 2 hours and about 24 hours in a flowing nitrogen atmosphere so as to form aluminum oxynitride.

BRIEF DESCRIPTION OF THE DRAWINGS

The following is a brief description of the drawings that form a part of this patent application.

DETAILED DESCRIPTION OF THE INVENTION

Figure 1:
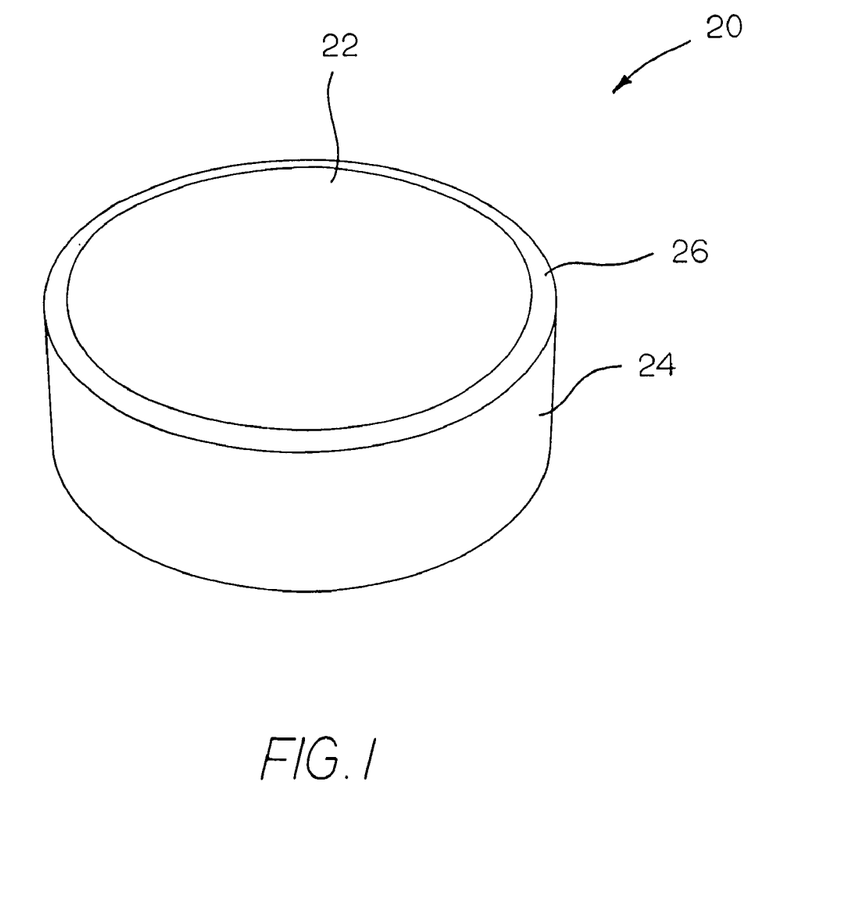
FIG. 1 is an isometric view of an RNG43T0320 style of ceramic cutting tool wherein the ceramic of the invention is useful as a cutting tool of this style.

Referring to the drawings, FIG. 1 shows a RNG43T0320 style of cutting tool generally designated as 20. Cutting tool 20 has a rake face 22 and a flank face 24. The rake face 22 and the flank face 24 intersect to form a cutting edge 26 at the juncture thereof wherein the cutting edge is of a generally circular shape. While the cutting tool 20 is shown as a generally cylindrical shaped cutting tool, it should be appreciated that the composition of the present invention can be made into other geometries of cutting tools. Further, although the specific embodiment shown is a cutting tool, it should be appreciated that the ceramic composition of the invention may be used for other products, such as, for example, wear products and impact resistant parts, as well as other structural applications.

Cutting tool 20 is not coated. The substrate of ceramic cutting tool 20 contains aluminum oxynitride and titanium carbonitride and silicon carbide whiskers.

As an alternative composition to the above ceramic composition, the ceramic substrate may further include alumina so that the ceramic substrate comprises aluminum oxynitride and titanium carbonitride and alumina and silicon carbide whiskers. The ceramic substrate contains alumina so as to provide improved chemical wear resistance.

For each one of the above compositions, applicants contemplate that the titanium carbonitride may be replaced in whole or in part by one or more of the following materials separately or in solid solution with each other or one or more other elements: hafnium carbonitride and zirconium carbonitride, boron carbide, titanium diboride, zirconium diboride, and hafnium diboride. Also for each one of the above compositions, the silicon carbide whiskers can be replaced in whole or in part by one or more other ceramic whiskers such as, for example, titanium carbide whiskers and/or titanium carbonitride whiskers and/or titanium nitride whiskers either alone or in any combination thereof.

In order to make the ceramic cutting tool 20, there is a starting powder mixture that comprises aluminum oxynitride, titanium carbonitride, and silicon carbide whiskers along with a sintering aid. One exemplary sintering aid is yttria. Other sintering aids include magnesia, zirconia, yttrium aluminum garnet, ytterbia and other rare earth oxides (e.g., lanthanum oxide, europium oxide, erbium oxide, cerium oxide, praseodymium oxide, neodymium oxide, promethium oxide, samarium oxide, gadolinium oxide, terbium oxide, dysprosium oxide, holmium oxide, and thulium oxide). In the one alternative ceramic composition, the starting powder mixture comprises aluminum oxynitride, titanium carbonitride, alumina, and silicon carbide whiskers along with a sintering aid such as, for example, yttria. In the other alternative ceramic composition, the starting powder mixture for the ceramic comprises aluminum oxynitride, alumina, silicon carbide and a sintering aid (e.g., yttria, magnesia, or the like). The sintering aid(s) can be present in an amount of less than or equal to about 3 volume percent of the starting powder mixture. More preferably, the sintering aid(s) can be present in an amount of less than or equal to about 1 volume percent of the starting powder mixture. In the case of zirconia, the zirconia can be present at higher levels, for example, in an amount on the order of about 5 volume percent as shown in Example No. 3 set forth hereinafter to further improve fracture toughness.

For all of the starting powder mixtures, the aluminum oxynitride starting powder is a high purity powder so that it does not contain a detectable content of residual aluminum nitride and preferably does not contain a detectable content of residual alumina. In this regard, the absence of a detectable content of residual aluminum nitride or a detectable content of residual alumina when using standard Bragg x-ray diffraction technique means that the residual aluminum nitride is present in an amount less than or equal to about 0.1 weight percent and that the residual alumina is present in an amount less than or equal to about 0.1 weight percent. It is most preferable that the aluminum oxynitride starting powder does not contain any residual aluminum nitride or any residual alumina.

Applicants believe that there are some advantages associated with using aluminum oxynitride starting powder that does not contain a detectable content of residual aluminum nitride or a detectable content of residual alumina. In this regard, one advantage of the high purity aluminum oxynitride starting powder is that there is a known content of aluminum oxynitride that results in better predictability as to the hot pressing conditions that are necessary to fully react the components during the formation of the ceramic. This predictability permits the use of shorter times and lower temperatures to hot press or consolidate the powder mixture into the ceramic. The use of shorter times and lower temperatures to hot press the ceramic result in less reaction between the matrix components and the whiskers (e.g., silicon carbide whiskers) so that the whiskers maintain their ability to adequately pull-out of the matrix, i.e., to reinforce the matrix as measured by the fracture toughness of the material.

The above advantages are in contrast to a ceramic formed using a powder mixture that contains alumina and aluminum nitride. In this regard, there is less control over the reaction to form the ceramic wherein the process uses a powder mixture that contains alumina and aluminum nitride. Thus, the hot pressing parameters to form the ceramic must include a time that is longer and a temperature that is higher so as to be able to fully react the alumina and the aluminum nitride. The use of longer times and higher temperatures results in a reduction in the efficiency of the hot pressing process because it takes more time and energy to form the ceramic. In addition, the use of longer times and higher temperatures results in more reaction between the whiskers (e.g., silicon carbide whiskers) and the matrix components and this can lead to a reduction in the ability of the whiskers to adequately pull-out of the matrix.

By reducing or eliminating the presence of residual aluminum nitride in the aluminum oxynitride starting powder, the present invention provides the advantage of reducing or eliminating a reaction between the silicon carbide whiskers and the residual aluminum nitride wherein the silicon carbide and the aluminum nitride form a solid solution that can degrade the performance of the material. In addition, by reducing or eliminating the presence of residual alumina in the aluminum oxynitride starting powder, the present invention provides the advantage of reducing or eliminating the potential for the residual alumina to form a liquid phase with the aluminum oxynitride at high temperatures wherein the formed liquid phase can degrade the performance of the material.

Still referring to the advantages, applicants believe that by using the high purity aluminum oxynitride starting powder, the hot pressing temperature can be about 1800° C. or less, and preferably 1750° C. or less. For example, one range for the hot-pressing temperature is between about 1600° C. and about 1800° C. This is in contrast to a process that uses a starting powder that contains alumina and aluminum nitride wherein such process requires a hot pressing temperature in the range of about 1900° C. to about 1975° C. to achieve essentially full densification.

The aluminum oxynitride starting powder is also fine wherein the average particle size is no more than about 5 micrometers, preferably, no more than about 1.0 micrometers. The high purity aluminum oxynitride powder is made by reaction sintering alumina and aluminum nitride in a nitrogen atmosphere. The time and temperature and the pressure of the sintering process are carefully controlled so that the resulting aluminum oxynitride does not contain any detectable alumina or any detectable aluminum nitride.

In regard to the process parameters necessary to make the aluminum oxynitride starting powder, its is believed that the following reaction takes place:

$$((4-x)/3)\text{alumina} + x \text{ aluminum nitride} \rightarrow Al_{(8+x)/3}O_{4-x}N_x$$

wherein x is in mole percent and x ranges between about 0.31 and about 0.61. The above reaction takes place within the following process parameters: a temperature range between about 1600 degrees Centigrade and about 1900 degrees Centigrade for a duration of between about 2 hours and about 24 hours in a flowing nitrogen atmosphere. For the aluminum oxynitride used in the examples that are set forth below x equals 0.35 and an effective amount of pure aluminum powder was added for balancing the effects of the nitrogen atmosphere, and preferably this amount ranges between about 0.1 to about 0.2 mole percent of pure aluminum powder. However, it should be appreciated that the amount of pure aluminum powder could range between about 0.2 mole percent and about 1.0 mole percent of the starting powder mixture. The aluminum oxynitride is a cubic spinel crystalline phase (gamma phase) that has the preferred formula: $Al_{2.78}O_{3.65}N_{0.35}$.

Example No. 1 is a ceramic of the present invention. Example No. 1 was made using the following starting powder mixture: about 26.2 volume percent titanium carbonitride powder wherein the titanium carbonitride powder had the following properties: molar ratio of carbon to nitrogen is 50:50 and the average particle size is about 3 micrometers and the oxygen content is less than about 1 weight percent; about 48.6 volume percent aluminum oxynitride wherein the aluminum oxynitride powder had the following properties: no detectable aluminum nitride or alumina and the average particle size was less than about 3 micrometers; about 25.0 volume percent silicon carbide whiskers wherein the silicon carbide whiskers were the SC-9 grade of silicon carbide whiskers obtained from Advanced Composite Materials Corporation of Greer, S.C., and the silicon carbide whiskers had the following properties: average diameter equal to about 0.6 micrometers, and a length of about 10-80 micrometers with an average aspect ratio equal to about 75, and the whisker content greater than about 90 percent; and about 0.2 volume percent yttria wherein the yttria powder had the following properties: average particle size equal to about 0.7 micrometers and a purity equal to greater than about 99.95 percent.

The starting powder mixture for Example No. 1 was formed by blending the aluminum oxynitride and the titanium carbonitride and the yttria powders, and then the silicon carbide whiskers were blended into the powder mixture so that they were thoroughly and uniformly distributed throughout the starting powder mixture. The powder mixture was then hot-pressed under the following conditions: a temperature of about 1700 degrees Centigrade for a duration of about one hour under a pressure of about 5000 pounds per square inch (psi) (34.5 MPa) and in either vacuum or in a protective atmosphere (e.g., nitrogen).

Table 1 set forth below reports selected physical properties of the Example No. 1 ceramic material. Referring to the properties, the density is reported in grams per cubic centimeter. The density was measured according to the procedure set forth in ASTM B311-93(2000) (Test Method for Density Determination for Powder Metallurgy (Materials Containing Less Than Two Percent Porosity)). The Young's Modulus (E) is reported in gigapascals (GPa) and was determined per ASTM E111-97 Standard Test Method for Young's Modulus, Tangent Modulus, and Chord Modulus. The Vicker's Hardness Number (VHN) is reported in gigapascals (GPa) and was determined per ASTM E384-99e1, Standard Test Method for Microindentation of Materials (at a load equal to 18.5 kilograms). The fracture toughness ($K_{IC}$) is reported in $M \cdot Pa \cdot m^{1/2}$ and was determined per the method set forth in the article by Evans and Charles entitled "Fracture Toughness Determinations by Indentation", Journal American Ceramic Society 59, Nos. 7-8. pages 371-372 (1976) [at a load equal to 18.5 kilograms].

TABLE I

Selected Properties of Example No. 1

| | | Property | | |
|---|---|---|---|---|
| | Density (g/cc) | Young's Modulus (GPa) | VHN (GPa) | Fracture Toughness ($K_{IC}$) Evans & Charles |
| Example No. 1 | 3.94 [theoretical density equal to 3.96 g/cc] | 394 | 19.13 | 5.80 |

Figure 2:
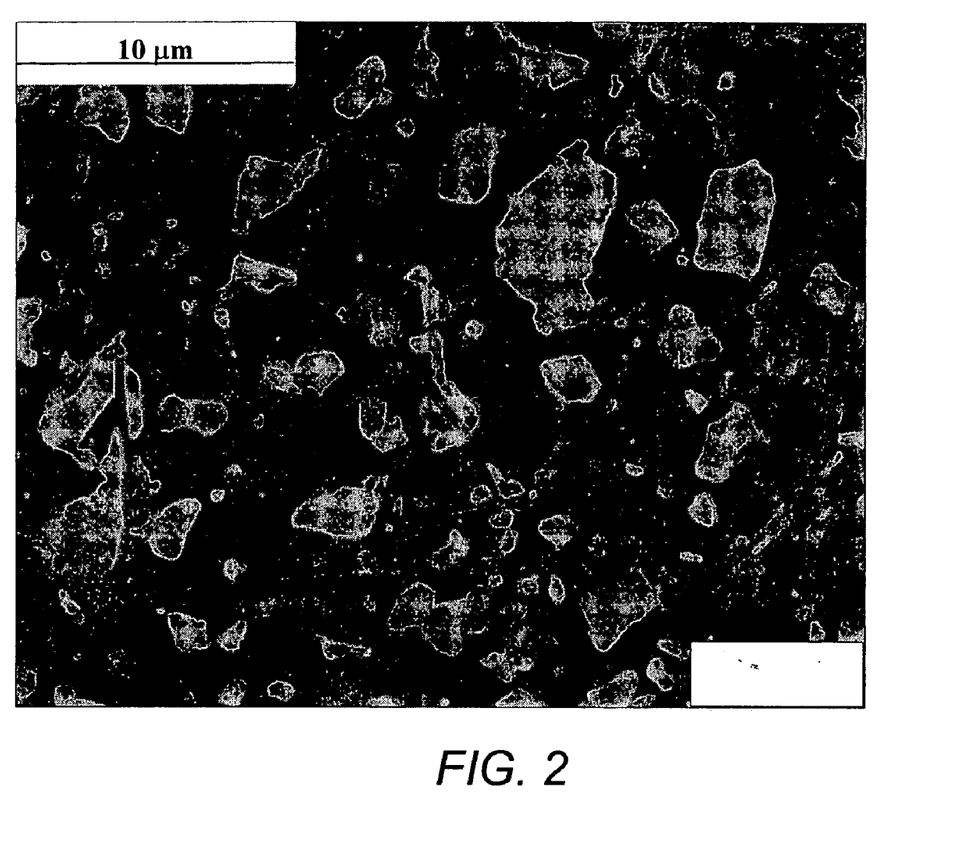
FIG. 2 is a photomicrograph taken by scanning electron microscopy (SEM) at a magnification equal to 3000× of the microstructure of Example No. 1.

FIG. 2 is a SEM photomicrograph of the microstructure of the ceramic of Example No. 1. FIG. 2 shows the homogeneously distributed needle-shaped silicon carbide whiskers and the irregular shaped titanium carbonitride wherein each one of these can be easily distinguished from the aluminum oxynitride. In this regard, the titanium carbonitride is the light phase and the aluminum oxynitride is the darker phase.

As previously mentioned, there are other compositions of the inventive ceramic wherein one of these compositions comprises aluminum oxynitride, titanium carbonitride, alumina and silicon carbide whiskers. For Example No. 2, Table 2 below sets forth the starting powder mixture (there is about 0.3 volume percent yttria sintering aid not listed in Table 2) in volume percent as well as a number of other properties described hereinafter.

TABLE 2

Starting Powder Composition (in Volume Percent) and Selected Properties of Example No. 2

| Example | Titanium carbonitride | Aluminum alumina | Silicon carbide oxynitride | Silicon carbide whiskers | Density (g/cc) | Temperature (° C.) | E (GPa) | VHN (GPa) | $K_{IC}$ E&C (MPa·$m^{1/2}$) |
|---|---|---|---|---|---|---|---|---|---|
| 2 | 22.4% | 36.6% | 15.7% | 25.0% | 4.02 | 1700 | 443 | 21.45 | 5.33 |

The properties of the starting powders in the powder mixture for Example No. 2 are the same as those of the starting powders in Example No. 1 to the extent that the starting powders are the same. Further, the alumina powder has the following properties: an average particle size equal to less than about 0.6 micrometers, and an impurity content equal to less than about 0.1 weight percent. The processing parameters for Example No. 2 are the same as those for Example No. 1. The testing standards used to test Example No. 2 were the same as those used to test Example No. 1.

Example No. 3 is another composition of the inventive ceramic and comprises titanium carbonitride, aluminum oxynitride, zirconia (possibly some hafnia) and silicon carbide whiskers. Table 3 below sets forth the starting powder composition and selected properties of the ceramic material. The properties of the starting powders in the powder mixture of Example No. 3 are the same as those in Example No. 1 and Example No. 2 to the extent that the starting powders are the same. In addition, the zirconia powder component has the following properties: monoclinic zirconia that can include some hafnia wherein the average particle size is equal to less than about 1.0 micrometers and the sum of the zirconia content and the hafnia content is equal to or greater than about 98.5 weight percent of the component with the hafnia content equal to less than or equal to about 2.5 weight percent of the component. The processing parameters are the same as those of Example No. 1, except that the hot pressing temperature was 1680° C. The testing standards used to test Example No. 3 were the same as those used to test Example No. 1.

One alternative composition of the inventive ceramic comprises aluminum oxynitride, alumina and silicon carbide whiskers. The processing parameters would be expected to be the same as those for Example No. 1.

Example No. 4 is another composition of the inventive ceramic and it contains aluminum oxynitride, silicon carbide whiskers and a sintering aid in the form of yttria. Table 4 sets forth the starting powder composition and selected properties of the ceramic. The properties of the starting powders for Example No. 4 were the same as those corresponding starting powders in Examples Nos. 1-3. The processing parameters for Example No. 4 were the same as those for Example No. 1. The test standards used to test Example No. 4 were the same as those used to test Example No. 1.

TABLE 4

Starting Powder Composition and Selected Properties of Example No. 4

| Example | Yttria | Aluminum oxynitride | Silicon carbide whiskers$_w$ | Density (g/cc) | Temperature (° C.) | E (GPa) | VHN (GPa) | $K_{IC}$ E&C (MPa·$m^{1/2}$) |
|---|---|---|---|---|---|---|---|---|
| 4 | 0.25 | 74.75 | 25.0 | 3.56 | 1700 | 360 | 17.46 | 5.80 |

Figure 3:
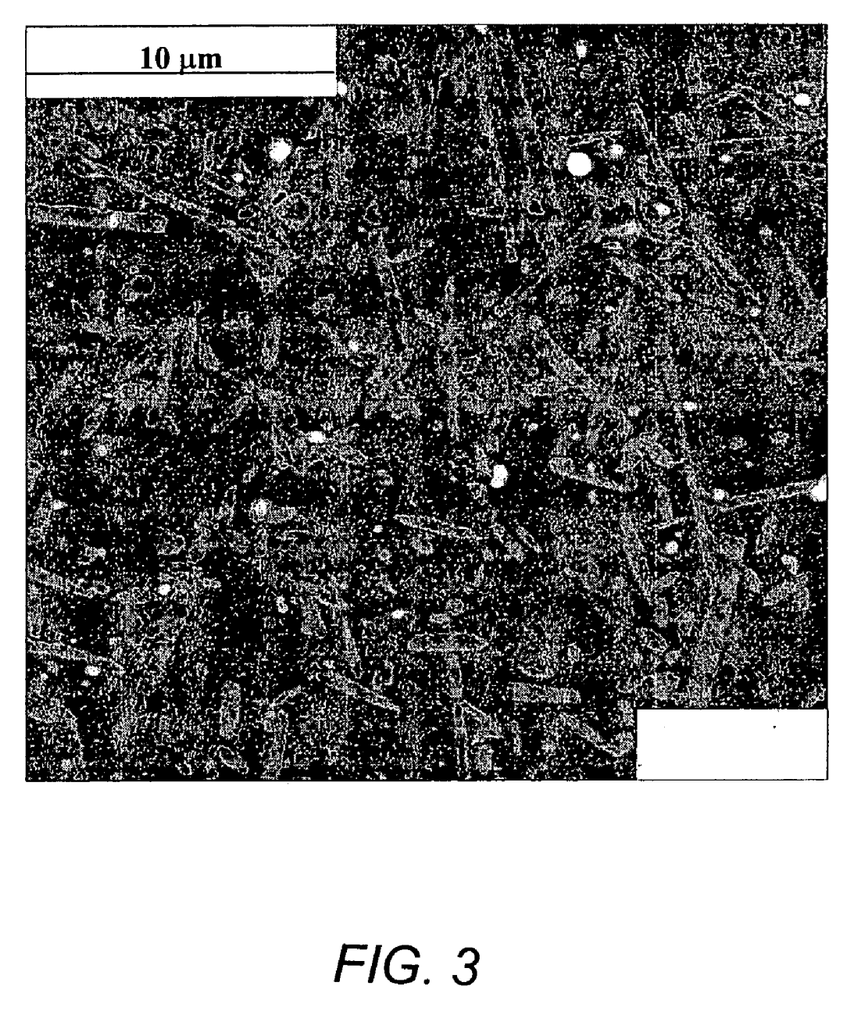
FIG. 3 is a photomicrograph taken by scanning electron microscopy (SEM) at a magnification equal to 3000× of the microstructure of Example No. 4.

FIG. 3 is a SEM photomicrograph that shows the microstructure of Example No. 4. In this regard, FIG. 3 shows the SiC whiskers as having a needle-like shape with a gray color and the balance is the aluminum oxynitride matrix. The bright spots in FIG. 3 are thought to be artifacts of titanium carbonitride from the alumina-titanium carbide milling media.

Tables 2 and 3 set forth below report metal cutting test results for cutting tools made from selected ones of the ceramic of Example No. 1 through Example No. 4 as compared to two other prior art cutting tools. One of the prior art cutting tools, i.e., Tool No. A, has the composition equal to about 38 volume percent titanium carbonitride, about 37 volume percent alumina and about 25 volume percent silicon carbide whiskers. The other prior art cutting tool, i.e., "Alumina-SiC$_w$ Tool" has a typical composition

TABLE 3

Starting Powder Composition (in Volume Percent) and Selected Properties of Example No. 3

| Example | Titanium carbonitride | Aluminum oxynitride | Silicon carbide whiskers$_w$ | Zirconia | Density (g/cc) | Temperature (° C.) | E (GPa) | VHN (GPa) | $K_{IC}$ E&C (MPa·$m^{1/2}$) |
|---|---|---|---|---|---|---|---|---|---|
| 3 | 22.5% | 47.5% | 25.0% | 5.0% | 3.99 | 1680 | 403 | 11.44 | 9.83 |

(based upon an analysis thereof) as follows: 69.75 volume percent alumina, between about 25 volume percent to about 32.5 volume percent silicon carbide whiskers and about 0.25 volume percent of sintering aid. The "Alumina-SiC$_w$ Tool" is available from at least two commercial sources. One such source is Greenleaf Corporation of Saegertown, Pa. that sells such a ceramic cutting tool under the designation WG-300. Another such source is the Sandvik Coromant Company of Sweden that sells such a ceramic cutting tool under the designation "CC670".

Table 5 presents test results (mean tool life in minutes) from a wet (flood coolant) turning test of a round bar of INCONEL 718 wherein the cutting parameters were: speed equal to about 900 surface feet per minute (295.3 surface meters per minute), a feed equal to about 0.006 inches per revolution (0.152 millimeters per revolution), and a depth of cut notch equal to 0.06 inches (1.52 millimeters). The cutting tool had the following geometry: RNG43T0320. The failure criteria were: flank wear, nose wear, and trail edge wear less than about 0.04 inches (or 1.016 millimeters), as well as depth-of-cut notch (DOCN) wear less than about 0.08 inches (or 2.032 millimeters).

TABLE 5

Turning Test Results on a Round Bar of INCONEL 718

| Tool | Mean Tool Life (minutes) |
|---|---|
| Example No. 1 | 6.0 |
| Example No. 2 | 5.6 |
| Tool A | 4.0 |
| Alumina-SiC$_w$ Tool | 6.0 |

Table 6 presents the test results (mean tool life in minutes) from the wet (flood coolant) turning of a round bar of INCONEL 718 wherein the cutting parameters were: speed equal to about 900 surface feet per minute (295.3 surface meters per minute), a feed equal to about 0.006 inches per revolution (0.152 millimeters per revolution), and a depth of cut equal to 0.06 inches (1.52 millimeters). The cutting tool had the following geometry: RNG43T0320. The failure criteria were: maximum flank wear, nose wear, and trail edge wear less than about 0.04 inches (or 1.016 millimeters), as well as depth-of-cut notch (DOCN) wear less than about 0.08 inches (or 2.032 millimeters). In Table 3, the designations along with the tool life reflect the failure mode wherein "ch" means chipping, "MW" means maximum wear, and "DN" means depth-of-cut notch wear.

TABLE 6

Turning Test Results (Tool Life in Minutes) on a Round Bar of INCONEL 718

| Tool | Rep. 1 | Rep. 2 | Rep. 3 | Mean Tool Life (Minutes) |
|---|---|---|---|---|
| Example No. 1 | 4.0 ch | 6.0 | 4.2 MW | 4.7 |
| Example No. 4 | 4.0 ch | 6.0 ch | 5.7 MW | 5.2 |
| Tool A | 4.0 | n/a | 6.0 ch | 5.0 |
| Alumina-SiC$_w$ Tool | 4.0 ch | 4.5 DN | 6.0 ch | 4.8 |

Table 7 presents the test results in tool life in minutes from a turning test of an eccentric bar of INCONEL 718 wherein the cutting parameters were: speed equal to about 500 surface feet per minute (164 surface meters per minute), a feed equal to about 0.006 inches per revolution (0.152 millimeters per revolution), and a depth of cut equal to 0.02-0.04 inches (0.508 to 1.02 millimeters). The cutting tool had the following geometry: RNG43T0320. The failure criteria were: flank wear, nose wear, and trail edge wear less than about 0.04 inches (or 1.016 millimeters), as well as depth-of-cut notch (DOCN) wear less than about 0.08 inches (or 2.032 millimeters). In Table 3, the designations along with the tool life reflect the failure mode wherein "BK" means breakage, and "DN" means depth-of-cut notch wear.

TABLE 7

Turning Test Results on an Eccentric Bar of INCONEL 718

| Tool | Rep. 1 | Rep. 2 | Mean Tool Life (Minutes) |
|---|---|---|---|
| Example No. 4 | 2.1 DN | 4.1 DN | 3.1 |
| Tool A | 3.0 BK | 1.6 DN | 2.3 |
| Alumina-SiC$_w$ Tool | 2.0 DN | 1.5 DN | 1.8 |

Table 8 presents the test results (in mean tool life in minutes) from a turning test of an eccentric bar of INCONEL 718 wherein the cutting parameters were: speed equal to about 500 surface feet per minute (164 surface meters per minute), a feed equal to about 0.006 inches per revolution (0.152 millimeters per revolution), and a depth of cut notch equal to 0.02-0.04 inches (0.508 to 1.02 millimeters). The cutting tool had the following geometry: RNG43T0320. The failure criteria were: flank wear, nose wear, and trailing edge wear less than about 0.04 inches (or 1.016 millimeters), as well as depth-of-cut notch (DOCN) wear less than about 0.08 inches (or 2.032 millimeters).

TABLE 8

Turning Test Results (Mean Tool Life in Minutes) on a Eccentric Bar of INCONEL 718

| Tool | Mean Tool Life (Minutes) |
|---|---|
| Example No. 1 | 1.8 |
| Example No. 2 | 1.0 |
| Example No. 3 | 1.4 |
| Tool A | 1.7 |
| Alumina-SiC$_w$ Tool | 2.2 |

In looking at the test results for the ceramic cutting inserts in straight turning and turning of an eccentric bar, it should be appreciated that these tests show different properties. The straight turning test shows the wear properties of the ceramic cutting insert. The toughness properties of the ceramic cutting insert are shown by the eccentric bar test.

Referring to the results for straight turning of INCONEL 718 reported in Table 5, the performance of the silicon carbide-reinforced aluminum oxynitride-titanium carbonitride ceramic cutting tool was better (6.0 vs. 4.0 minutes) than the Tool A ceramic cutting tool and was competitive (6.0 vs. 6.0 minutes) with the Alumina-SiC$_w$ tool ceramic cutting tool in straight turning of INCONEL 718. Straight turning is a measure of the wear resistance of the ceramic cutting tool. The performance of the aluminum oxynitride-titanium carbonitride-alumina-silicon carbide whisker ceramic cutting tool was better than Tool A (5.6 vs. 4.0 minutes), but somewhat less (5.6 vs. 6.0 minutes) than, the Alumina-SiC$_W$ ceramic cutting tool.

Referring to the results for straight turning of INCONEL 718 as reported in Table 6, the performance of the silicon carbide-reinforced aluminum oxynitride-titanium carbonitride ceramic cutting tool was slightly less (4.7 vs. 5.0 minutes) than the Tool A ceramic cutting tool and essentially competitive (4.7 vs. 4.8 minutes) with the Alumina-SiC$_w$ tool ceramic cutting tool. The performance of the aluminum oxynitride-silicon carbide ceramic cutting tool was slightly better than Tool A (5.2 vs. 5.0 minutes) and also better (5.2 vs. 4.8 minutes) than the Alumina-SiC$_W$ ceramic cutting tool.

Referring to the test results for turning an eccentric bar of INCONEL 718 as reported in Table 7, the performance of the aluminum oxynitride-silicon carbide ceramic cutting tool was better than Tool A (3.1 vs. 2.3 minutes) and also better (3.1 vs. 1.8 minutes) than the Alumina-SiC$_W$ ceramic cutting tool. The test of turning an eccentric bar is a measure of the toughness of the ceramic cutting tool.

Referring to the test results for turning an eccentric bar of INCONEL 718 as reported in Table 8, the aluminum oxynitride-titanium carbonitride-silicon carbide whiskers ceramic cutting tool had slightly better (1.8 vs. 1.7 minutes) tool life than Tool A, but less tool life (1.8 vs. 2.2 minutes) than the Alumina-SiC$_W$ ceramic cutting tool. The aluminum oxynitride-titanium carbonitride-alumina-silicon carbide whiskers ceramic cutting tool had less tool life (1.0 vs. 1.7 minutes) tool life than Tool A, as well as less tool life (1.0 vs. 2.2 minutes) than the Alumina-SiC$_W$ ceramic cutting tool. The aluminum oxynitride-titanium carbonitride-zirconia-silicon carbide whiskers ceramic cutting tool had less tool life (1.4 vs. 1.7 minutes) tool life than Tool A, as well as less tool life (1.4 vs. 2.2 minutes) than the Alumina-SiC$_W$ ceramic cutting tool.

Example No. 5 is another embodiment of a ceramic of the present invention. Example No. 5 was made using the following starting powder mixture: about 9.07 volume percent titanium carbonitride powder (H. D. Stark grade D) having a molar ratio of carbon to nitrogen of 50:50; about 60.68 volume percent alumina oxynitride powder having the following properties: no detectable aluminum nitride or alumina and an average particle size of less than 3 μm; about 30 volume percent of silicon carbide whiskers, grade SC-9; and about 0.25 volume percent of yttria powder, H. C. Stark, grade C.

The powder mixture for Example No. 5 was formed by blending the aluminum oxynitride, titanium carbonitride and yttria powders, and then blending in the silicon carbide whiskers. The powder mixture was hot pressed under the following conditions: a temperature of about 1780 degrees Centigrade for a duration of about 1 hour under a pressure of about 35 MPa in vacuum. The densified hot pressed billet was then cut and ground into indexable cutting inserts.

The aluminum oxynitride average grain size of the densified Example No. 5 material was about 2 to 3 μm. The excellent hot hardness of this material is shown in Table 9 below:

TABLE 8

Vickers Hot Hardnesses (500 gm), GPa

| Temperature | Hardness (x of 5) |
|---|---|
| Room T. | 19.51 |
| 200° C. | 16.45 |
| 400° C. | 15.42 |
| 600° C. | 14.02 |
| 800° C. | 12.17 |
| 1000° C. | 10.17 |

At room temperature, this Example No. 5 material has a Rockwell A hardness ranging from about 94.2 to about 94.8, a Vickers hardness ranging from about 17.0 to about 19.5 GPa, a $K_{IC}$-E+C fracture toughness of about 5.0 to about 6.5 MPam$^{1/2}$, and a density of about 3.65 to 3.69 g/cc.

Thus, it is apparent that the present ceramic material is an improved whisker-reinforced ceramic material, and especially a whisker-reinforced ceramic material useful as a cutting tool, that contains aluminum oxynitride. Further, it is apparent that the present ceramic is an improved whisker-reinforced ceramic material, and especially a whisker-reinforced ceramic material useful as a cutting tool, that contains aluminum oxynitride wherein the whisker exhibit satisfactory pull-out. In addition, it is apparent that the present ceramic material is an improved whisker-reinforced ceramic material, and especially a whisker-reinforced ceramic material useful as a cutting tool, that contains aluminum oxynitride wherein the hot-pressing of the powder mixture occurs at a temperature low enough so as to not damage the silicon carbide whiskers. Finally, it is apparent that the present ceramic is an improved whisker-reinforced ceramic material, and especially a whisker-reinforced ceramic material useful as a cutting tool, that contains aluminum oxynitride wherein there is control over the amount of aluminum oxynitride in the ceramic.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A process to make a ceramic body comprising the steps of:
   providing a starting powder mixture comprising ceramic whiskers, a ceramic additive powder other than aluminum oxynitride, and aluminum oxynitride powder that contains less than or equal to about 0.1 weight percent aluminum nitride wherein the aluminum oxynitride powder is made by a process comprising the steps of: forming a powder mixture by mixing alumina powder and aluminum nitride powder according to the following formula: ((4−x)/3) alumina and x aluminum nitride wherein x is in mole percent and ranges between about 0.31 and about 0.61; adding between about 0.1 mole percent and about 1.0 mole percent of pure aluminum powder to the powder mixture; and reacting the powder mixture containing aluminum at a temperature between about 1600° C. and about 1900° C. for a duration between about 2 hours and about 24 hours in a flowing nitrogen atmosphere so as to form aluminum oxynitride;
   consolidating the starting powder mixture into the ceramic body, and wherein the ceramic body having a Vicker's Hardness Number (VHN) determined per ASTM E384-99e1 being at least about 15.00, and a fracture toughness ($K_{IC}$) per Evans and Charles being at least about 5.0 MPa·m$^{1/2}$.

2. A process to make a ceramic body comprising the steps of:
   providing a starting powder mixture comprising between about 2 and about 40 volume percent silicon carbide whiskers and between about 5 volume percent and about 35 volume percent of a ceramic additive comprising one or more of the following materials taken separately or in solid solution with each other or other elements: titanium carbonitride, hafnium carbonitride, zirconium carbonitride, and boron carbide, and between about 40 and about 98 volume percent aluminum oxynitride powder wherein the aluminum oxynitride powder is made by a process comprising the steps of: forming a powder mixture by mixing alumina powder and aluminum nitride powder according to the following formula: ((4−x)/3) alumina and x aluminum nitride wherein x is in mole percent and ranges between about 0.31 and about 0.61; adding between about 0.1 mole percent and about 1.0 mole percent of pure aluminum powder to the powder mixture; and reacting the powder mixture containing aluminum at a temperature between about 1600° C. and about 1900° C. for a duration between about 2 hours and about 24 hours in a flowing nitrogen atmosphere so as to form aluminum oxynitride; and consolidating the starting powder into the ceramic body.

3. A process to make a ceramic body comprising the steps of:

providing a starting powder mixture comprising between about 2 and about 40 volume percent whiskers and between about 40 and about 98 volume percent aluminum oxynitride powder wherein the aluminum oxynitride powder is made by a process comprising the steps of: forming a powder mixture by mixing alumina powder and aluminum nitride powder according to the following formula: ((4−x)/3) alumina and x aluminum nitride wherein x is in mole percent and ranges between about 0.31 and about 0.61; adding between about 0.1 mole percent and about 1.0 mole percent of pure aluminum powder to the powder mixture; and reacting the powder mixture containing aluminum at a temperature between about 1600° C. and about 1900° C. for a duration between about 2 hours and about 24 hours in a flowing nitrogen atmosphere so as to form aluminum oxynitride; and hot-pressing the starting powder into the ceramic body at a temperature less than or equal to about 1750° C.

4. The process of claim 3 wherein the hot pressing temperature ranges between about 1600° C. and about 1750° C.

5. A process to make a ceramic body comprising the steps of:

providing a starting powder mixture comprising between about 10 volume percent and about 25 volume percent of aluminum oxynitride powder that contains less than or equal to about 0.1 weight percent aluminum nitride, and between about 15 and about 35 volume percent titanium carbonitride powder and between about 25 and about 40 volume percent alumina powder and between about 15 and about 35 volume percent ceramic whiskers; and consolidating the starting powder mixture into the ceramic body, and wherein the ceramic body having a Vicker's Hardness Number (VHN) determined per ASTM E384-99e1 being at least about 15.00, and a fracture toughness ($K_{IC}$) per Evans and Charles being at least about 5.0 MPa·m$^{1/2}$.

6. The process of claim 5 wherein the starting powder mixture further contains one or more of the following materials taken separately or in solid solution with each other or other elements: hafnium carbonitride, zirconium carbonitride, titanium diboride, zirconium diboride, hafnium diboride, and boron carbide.

7. The process of claim 5 wherein the ceramic body comprises a cutting insert, and the cutting insert has a rake surface and a flank surface wherein the rake surface and the flank surface intersect to form a cutting edge.

8. The process of claim 5 wherein the starting powder mixture comprises a sintering aid present in an amount less than or equal to 3 volume percent of the starting powder mixture.

9. The process of claim 5 wherein the starting powder mixture comprises a sintering aid present in an amount less than or equal to 1 volume percent of the starting powder mixture.

10. The process of claim 5 wherein the consolidation step comprising hot pressing the starting powder into the ceramic body at a temperature less than or equal to about 1750° C.

11. The process of claim 10 wherein the hot pressing temperature ranges between about 1600° C. and about 1750° C.

12. The process of claim 5 wherein the ceramic whiskers comprise silicon carbide whiskers.

13. A process to make a ceramic body comprising the steps of:

providing a starting powder mixture comprising between about 30 and about 60 volume percent aluminum oxynitride powder that contains less than or equal to about 0.1 weight percent aluminum nitride, and between about 1 and about 10 volume percent zirconia powder and between about 15 and about 35 volume percent ceramic whiskers, between about 15 volume percent and about 35 volume percent titanium carbonitride powder; and consolidating the starting powder mixture into the ceramic body, and wherein the ceramic body having a Vicker's Hardness Number (VHN) determined per ASTM E384-99e1 being at least about 15.00, and a fracture toughness ($K_{1C}$) per Evans and Charles being at least about 5.0 MPa·m$^{1/2}$.

14. The process of claim 13 wherein the starting powder mixture further contains one or more of the following materials taken separately or in solid solution with each other or other elements: hafnium carbonitride, zirconium carbonitride, titanium diboride, zirconium diboride, hafnium diboride, and boron carbide.

15. The process of claim 13 wherein the ceramic body comprises a cutting insert, and the cutting insert has a rake surface and a flank surface wherein the rake surface and the flank surface intersect to form a cutting edge.

16. The process of claim 13 wherein the starting powder mixture comprises a sintering aid present in an amount less than or equal to 3 volume percent of the starting powder mixture.

17. The process of claim 13 wherein the starting powder mixture comprises a sintering aid present in an amount less than or equal to 1 volume percent of the starting powder mixture.

18. The process of claim 13 wherein the consolidation step comprising hot pressing the starting powder into the ceramic body at a temperature less than or equal to about 1750° C.

19. The process of claim 18 wherein the hot pressing temperature ranges between about 1600° C. and about 1750° C.

20. The process of claim 18 wherein the ceramic whiskers comprise silicon carbide whiskers.

21. A process to make a ceramic body comprising the steps of:

providing a starting powder mixture comprising between about 5 and about 40 volume percent of titanium carbon itride powder and between about 2 and about 40 volume per ceramic whiskers and between about 30 and about 70 volume percent aluminum oxynitride powder that contains less than or equal to about 0.1 weight percent aluminum nitride wherein the aluminum oxynitride powder is made by a process comprising the steps of: forming a powder mixture by mixing alumina powder and aluminum nitride powder according to the following formula; ((4−x)/3) alumina and x aluminum nitride wherein x is in mole percent and ranges between about 0.31 and about 0.61 adding between about 0.1 mole percent and about 1.0 mole percent of pure aluminum powder to the powder mixture; and reacting the powder mixture containing aluminum at a temperature between about 1600° C. and about 1900° C. for a duration between about 2 hours and about 24 hours in a flowing nitrogen atmosphere so as to form aluminum oxynitride; and consolidating the starting powder mixture into the ceramic body, and wherein the ceramic body having a Vicker's Hardness Number (VHN) determined per ASTM E384-99e1 being at least about 15.00, and a fracture toughness ($K_{IC}$) per Evans and Charles being at least about 5.0 MPa·m$^{1/2}$.

22. The process of claim 21 wherein the starting powder mixture further contains one or more of the following materials taken separately or in solid solution with each other or other elements: hafnium carbonitride, zirconium carbonitride, titanium diboride, zirconium diboride, hafnium diboride, and boron carbide.

23. The process of claim 21 wherein the ceramic body comprises a cutting insert, and the cutting insert has a rake surface and a flank surface wherein the rake surface and the flank surface intersect to form a cutting edge.

24. The process of claim 21 wherein the starting powder mixture comprises a sintering aid present in an amount less than or equal to 3 volume percent of the starting powder mixture.

25. The process of claim 21 wherein the starting powder mixture comprises a sintering aid present in an amount less than or equal to 1 volume percent of the starting powder mixture.

26. The process of claim 21 wherein the consolidation step comprising hot pressing the starting powder into the ceramic body at a temperature less than or equal to about 1750° C.

27. The process of claim 26 wherein the hot pressing temperature ranges between about 1600° C. and about 1750° C.

28. The process of claim 21 wherein the ceramic whiskers comprise silicon carbide whiskers.

29. The process of claim 5 wherein the starting powder mixture contains zirconia.

30. The process of claim 21 wherein the starting powder mixture further contains zirconia powder.

* * * * *